(12) United States Patent
Murphy

(10) Patent No.: US 9,171,192 B2
(45) Date of Patent: Oct. 27, 2015

(54) ONE TOUCH DATA COLLECTION METHOD AND MEDIUM

(71) Applicant: Aktiebolaget SKF, Göteborg (SE)

(72) Inventor: Jon D Murphy, Friday Harbor, WA (US)

(73) Assignee: AKTIEBOLAGET SKF, Gothenburg (SE)

( * ) Notice: Subject to any disclaimer, the term of this patent is extended or adjusted under 35 U.S.C. 154(b) by 260 days.

(21) Appl. No.: 13/872,406

(22) Filed: Apr. 29, 2013

(65) Prior Publication Data

US 2014/0320303 A1 Oct. 30, 2014

(51) Int. Cl.
*G06K 7/10* (2006.01)
(52) U.S. Cl.
CPC .................................. *G06K 7/10415* (2013.01)
(58) Field of Classification Search
USPC .......................... 235/375, 382, 492; 340/10.1
See application file for complete search history.

(56) References Cited

U.S. PATENT DOCUMENTS

| 2006/0213964 A1* | 9/2006 | Excoffier et al. ............. 235/375 |
| 2009/0046964 A1* | 2/2009 | Galeote ......................... 384/448 |
| 2011/0181394 A1* | 7/2011 | Blair ............................ 340/10.1 |
| 2013/0057390 A1* | 3/2013 | Watt et al. .................... 340/10.1 |
| 2014/0027507 A1* | 1/2014 | Jonely ........................... 235/382 |

* cited by examiner

*Primary Examiner* — Allyson Trail
(74) *Attorney, Agent, or Firm* — Bryan Peckjian; SKF USA Inc. Patent Dept.

(57) ABSTRACT

A method for collecting data and a computer-readable medium are provided. The method includes determining, using a data collection unit, that the data collection unit is physically proximal to a machine, and receiving a tag identifier from a tag positioned in, on, or near the machine using a tag reader of the data collection unit. The method also includes taking one or more measurements of one or more operating conditions of the machine using a sensor of the data collection unit. The method also includes storing the one or more measurements, and associating the one or more measurements with the tag identifier.

16 Claims, 6 Drawing Sheets

ONE TOUCH DATA COLLECTION METHOD AND MEDIUM

TECHNICAL FIELD

The present disclosure relates to data collection, e.g., of operating conditions of a machine.

BACKGROUND

Data is often collected to monitor the operation of industrial machines. Such data collection may be used to diagnose problems, troubleshoot, trend operating changes, or otherwise take data points indicative of machine operation. A variety of data types may be collected, and may include temperature, vibration, and the like. The data collection may be continuous, i.e., using dedicated resources for individual machines or groups of machines. In other cases, data collection may be on-demand, for example, in routine checking and maintenance of the machines. In the latter case, mobile units may be provided that may use sensors that are either permanently or temporarily coupled with the machine being measured.

Such on-demand data collection may, however, be costly in terms of time and resources. For example, if several machines are being checked using a mobile unit, complexity in the operation of the unit may be multiplied and can require significant time allocation. Further, bulkiness of such units may hinder movement between machines, as proceeding between machines being checked. However, a reduction in unit size may reduce functionality, such as the ability to retain measurements from previous operations, which may form the basis for trending operating conditions. Complexity can also introduce the possibility of human error, and thus resources may be expended in training users to operate the units.

SUMMARY

Embodiments of the disclosure may provide a method for collecting data. The method includes determining, using a data collection unit, that the data collection unit is physically proximal to a machine, and receiving a tag identifier from a tag positioned in, on, or near the machine using a tag reader of the data collection unit. The method also includes taking one or more measurements of one or more operating conditions of the machine using a sensor of the data collection unit. The method also includes storing the one or more measurements, and associating the one or more measurements with the tag identifier.

Embodiments of the disclosure may also provide a non-transitory computer-readable medium containing instructions that, when executed, are configured to cause a data collection unit to perform operations. The operations include receiving a tag identifier from a tag positioned in, on, or near a machine, using a tag reader of the data collection unit. The operations further include taking one or more measurements of one or more operating conditions of the machine, using a sensor of the data collection unit. The operations also include storing the one or more measurements, and associating the one or more measurements with the tag identifier.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
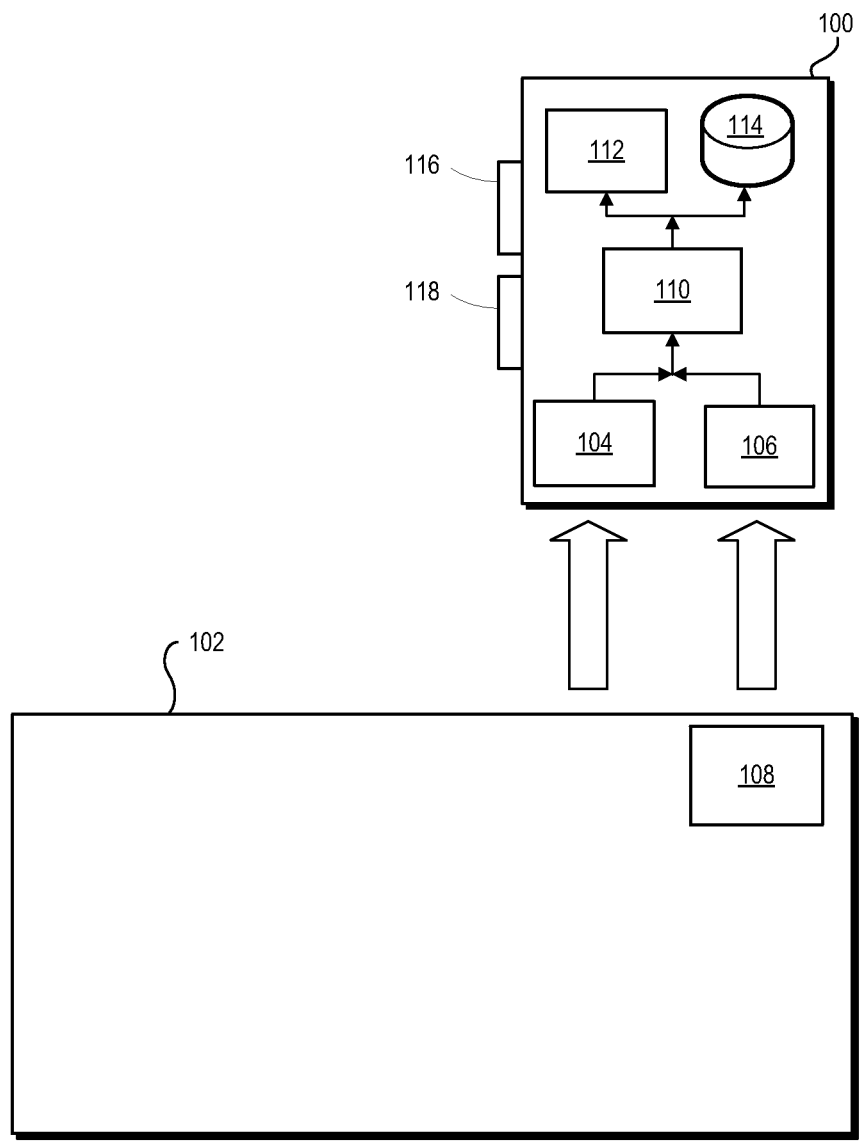
FIG. 1 illustrates a schematic view of a data collection unit interacting with a machine, according to an embodiment.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

In general, the present disclosure includes a data collection unit and methods for collecting data. In an embodiment, the unit may be configured to measure certain operating conditions, such as, for example, vibration and temperature data, of a machine. Accordingly, the unit may include sensors configured to measure any appropriate data.

The unit may be placed into physical proximity, e.g., in contact with, a machine, and activated. Upon activation, the unit may automatically determine that it is measuring machine data, and then may read a unique tag identifier from a tag fixed in, on, or near the machine. In some cases, the unit may be disposed directly in physical contact with the tag, but in other embodiments may be a distance away from the tag. The unit may then automatically determine a steady-state measurement of the operating condition(s). The unit may also store the steady-state measurement in association with the tag identifier, either graphically by freezing a display of both, in an electronic database that may be on-board the unit and may be accessed later for downloading measurement information therefrom, or both. Thus, the unit may, for example, seamlessly and automatically perform operations to detect and log accurate measurements and associate them with a particular machine for subsequent analysis.

Turning now to the specific, illustrated embodiments, FIG. 1 depicts a simplified schematic view of a data collection unit 100 for taking measurements of operating conditions of a machine 102, according to an embodiment. The machine 102 may be any type of device or devices, for example, industrial machinery such as engines, motors, compressors, turbines, etc. The unit 100 may include a probe 104, which may be or include any suitable type of sensor or multiple sensors of the same or different types. For example, the probe 104 may be or include a temperature sensor such as a thermistor, thermocouple, infrared sensor, or the like, a velocity sensor, an accelerometer, a vibration sensor, a potentiometer, an ammeter, an ohmmeter, a magnetic field sensor, and/or any other suitable type of sensor configured to collect any type of data characterizing operation of the machine 102. In some embodiments, the probe 104 may be configured to measure multiple types of operating conditions (e.g., temperature and vibration) simultaneously, sequentially, selectively, or a combination thereof.

The unit 100 may also include a tag reader 106. The tag reader 106 may be configured to receive information from a location tag 108. The location tag 108 may be located physically proximal to the machine 102 and thus may be characterized as being "associated with" or "of" the machine 102. For example, the location tag 108 may be mounted to a nearby wall or floor, fixed to a portion of the machine 102, or otherwise secured proximal to the machine 102. Further, it will be appreciated that the location tag 108 being "proximal to" the machine 102 may include the location tag 108 being positioned inside the machine 102.

The location tag 108 may be a radio-frequency identification (RFID) tag. Accordingly, the location tag 108 and the tag reader 106 may form an RFID system of any type, such as a passive reader active tag system, active reader passive tag system, an active reader active tag system, or any other type of system. In one embodiment, the tag reader 106 may include an inductor coil or another type of exciter that is configured to supply energy to the location tag 108. Such energy supply may cause the location tag 108 to transmit information back to the tag reader 106. The location tag 108 and tag reader 108 may be configured to communicate across any suitable distance. For example, the location tag 108 may be a near-field communication (NFC) tag, requiring the tag reader 106 be immediately proximal to the location tag 108, or may be any other type of RFID tag configured for communication at any suitable range from the location tag 108, e.g., within a footprint of the machine 102.

The information read from the location tag 108 may include a tag identifier, which may be unique. The tag identifier may be associated with other information, such as, for example, a serial number, location, model, and/or type, of the machine 102 to which it is affixed. In some embodiments, the tag identifier may be or include direct identifying information of the machine, such as its model and/or serial number. Further, the location tag 108 may include additional information, such as expected operating conditions and/or an operating envelope of the machine 102, which may be read and employed by the unit 100 in making determinations, as will be described in greater detail below.

The unit 100 may also include one or more processors 110, a display 112, and a database 114. The processor 110 may be any suitable type of processor and may be configured to communicate with the probe 104 and the tag reader 106, so as to at least receive information therefrom. The processor 110 may also be coupled with the display 112. Accordingly, the processor 110 may receive and interpret data collected using the probe 104 and/or the tag reader 106, and show the data on the display 112 so the user may read the data. The display 112 may be any suitable type of display, such as a liquid crystal display (LCD), touchscreen, or any other suitable type of display.

The database 114 may be contained on any suitable computer-readable medium or media. The computer-readable medium may be disposed on-board the unit 100 and/or removable; for example, the medium may be a flash drive. In other embodiments, the on-board computer-readable medium may require disassembly of the unit 100 to be removed, and thus may be considered permanently integrated with the unit 100. In some cases, the computer-readable medium may be external and linked to the processor 110 via a wired (e.g., universal serial bus (USB), Ethernet, or the like) or a wireless (e.g., Bluetooth) connection, while still being considered as included in the unit 100. Further, the database 114 may store data collected by the probe 104 and information (e.g., the tag identifiers) read by the tag reader 106.

In various embodiments, the unit 100 may be integrated, such that the probe 104, tag reader 106, processor 110, display 112, and/or database 114 may be disposed in a casing, in a generally permanent manner. In some embodiments, the casing may be ruggedized so as to protect the components of the unit 100 from mechanical impacts, water, chemicals, electrical shock, etc. In some embodiments, one or more components of the unit 100 may be removable and/or replaceable, according to a modular embodiment of the unit 100. For example, the probe 104 and/or tag reader 106 may be integrated in the unit 100, or may be removably secured, e.g., to the casing of the unit 100, and coupled to the processor 110 via a data link (e.g., a universal serial bus (USB) connection), and removable therefrom.

The unit 100 may be a special-purpose device, configured and/or optimized to be used generally exclusively for data collection from the machine 102. In other embodiments, the unit 100 may be a general-purpose mobile device, which may be extensible by including one or more various type of probes 104 and/or tag readers 106, e.g., as peripheral input device. In either example, the unit 100 may be considered as "including" the probe 104 and tag reader 106. As the term is used herein, "mobile device" may refer to any type of mobile or standalone device, including any combination of hardware and software, capable of supporting the functionalities and data processing/transmitting techniques discussed herein. For example, the unit 100 may be or include a mobile phone, a tablet device, a notebook device, a personal data assistant (PDA), or the like.

The unit 100 may also include one or more input indicators, such as buttons 116, 118. In some embodiments, the buttons 116, 118 may be physical, raised buttons that are depressible by a user, or may be areas of a touchscreen. In other embodiments, the input indicator may be a microphone and/or camera configured to receive audio and/or visual input, respectively. In the illustrated embodiment, the button 116 may be employed to activate the unit 100. For example, the button 116 may be configured to power up the unit. In another embodiment, the button 116 may indicate to the processor 110 that a data collection session is to begin, e.g., by the processor 110 instructing the probe 104 to begin collecting data. The button 118 may be employed to indicate a hold mode. As such, when the button 118 is depressed, the unit 100 may continue to display the most recent data point collected, for example, until the button 118 is released, pressed again, or the hold mode is otherwise deactivated.

Figure 2:
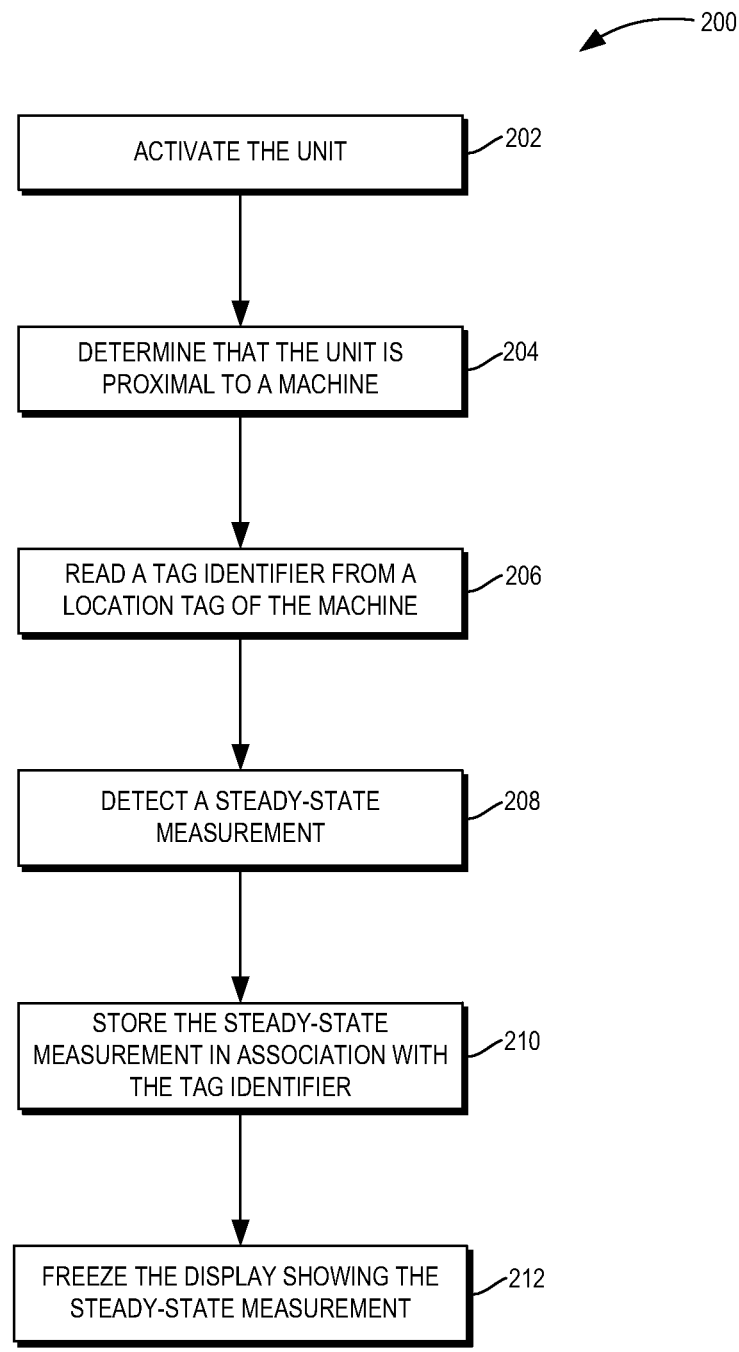
FIG. 2 illustrates a flowchart of a method for collecting data, according to an embodiment.

FIG. 2 illustrates a flowchart of a method 200 for collecting data, according to an embodiment. Embodiments of the method 200 may proceed by operation of the unit 100 discussed above, and thus, for convenience, the method 200 is described herein with reference thereto. However, it will be understood that the method 200 is not limited to any particular hardware or structure, unless otherwise expressly stated herein. The method 200 may begin by activating the unit 100, as at 202. Activating the unit 100 at 202 may include a user pressing the button 116, instructing the unit 100 to execute a data collection application, or otherwise indicating to the unit 100 that the user is prepared to employ the unit 100 to collect data from the machine 102. Such activation may cause the processor 110 of the unit 100 to activate the probe 104.

The method 200 may then proceed to the unit 100 determining that it is physically proximal to the machine 102, as at 204. The term "physically proximal" (or any grammatical variant thereof), as it is used herein, may be a distance from the machine 102 within which the probe 104 is able to accurately measure a selected operating condition of the machine 102. For example, the probe 104 may be required to be within a certain distance from a portion of the machine 102 to accurately measure data for the operation of the machine 102. If the probe 104 is too far away, the measurements may be affected by the ambient conditions (e.g., temperature, magnetic field, etc.). In some cases, the probe 104 may be required to be in contact with the machine 102, such as, for example, to detect vibration, electrical operating conditions, etc. Accordingly, whether the unit 100 is "physically proximal," as the term is used herein, may be affected by what type of data is to be collected.

Figure 3:
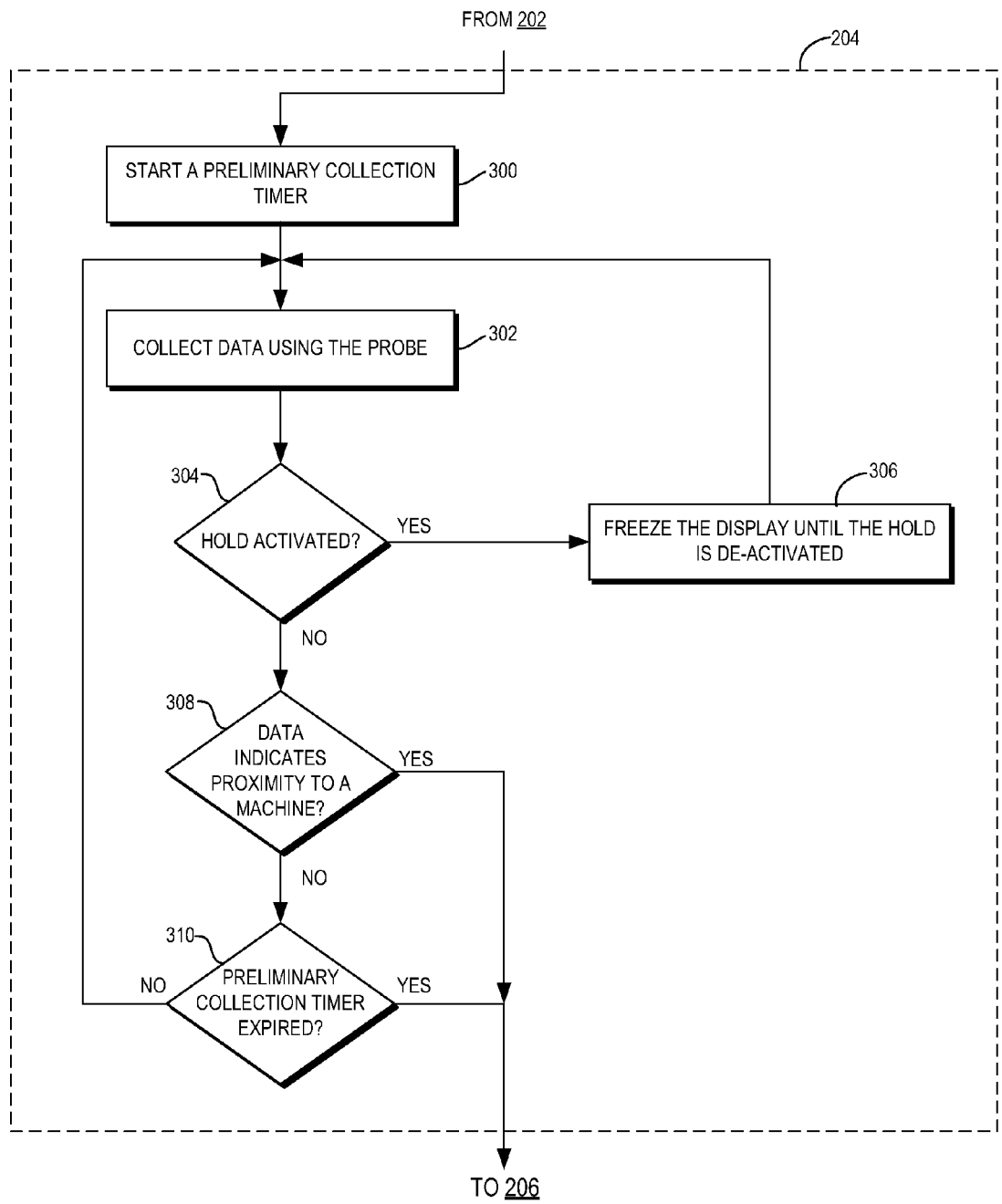
FIG. 3 illustrates a flowchart of a process for determining that the unit is physically proximal to the machine, which may be employed as part of the method of FIG. 2, according to an embodiment.

With continuing reference to FIG. 2, FIG. 3 illustrates a flowchart of a process for determining at 204 that the unit 100 is physically proximal to the machine 102, according to an embodiment. As shown, the determining process 204 may begin by starting a preliminary data collection timer, as at 300. The preliminary data collection timer may be set to any suitable value, which may be on the order of milliseconds, seconds, minutes, or more. The preliminary data collection timer may be set to avoid delays of indeterminate length while the unit 100 determines that it is disposed physically proximal to the machine 102.

The unit 100 may then proceed to collecting preliminary data using the probe 104, as at 302. Such collection may proceed by taking one or more preliminary measurements, for example, a first preliminary measurement and a second preliminary measurement. During, subsequent to, or before such preliminary data collection at 302, the unit 100 may also determine whether a hold is activated, as at 304. The hold may be activated via one or more of the input indicators, for example, the button 118. Accordingly, a hold activation may be a process interrupt, which may occur at any point in the method 200. In other cases, detecting the hold at 304 may be an event that occurs in sequence at any predetermined point(s) in the method 200.

If the unit 100 determines that a hold has been activated at 304, the unit 100 may freeze the display 112, as at 306, for example, showing the most recent data collected at 302. In some cases, however, no data may have been collected at 302, and the display 112 may be frozen with the last data point collected in a previous data collection session. The display may be frozen at 306 until the hold is de-activated. For example, the button 118 may be pressed again, released, or another button or other type of input indicator may cause the unit 100 to end the hold at 306. Thereafter, the unit 100 may return to the point in the determining process 204 at which the hold was detected. In other cases, the unit 100 may proceed directly back to collecting data at 302 and/or may reset the preliminary data collection timer at 300. Initiating the hold may or may not toll the preliminary data collection timer. In yet other embodiments, freezing the display at 306 may not stop the data collection at 302, and thus the determining process 204 may continue during the hold.

If a hold is not activated at 304, or, in some cases, even if it is, the unit 100 undertaking the determining process 204 may proceed to determining whether the preliminary data collected indicates the unit 100 is physically proximal to the machine 102, as at 308. If, for example, a difference between the first preliminary measurement and the second preliminary measurement indicates a rise in temperature, vibration, another type of data, or a combination thereof, above a threshold amount, percentage, and/or rate, the difference may indicate that the unit 100 is physically proximal to the machine 102. In other embodiments, any other data measurement variation, whether an increase or decrease, may indicate that the unit 100 is physically proximal to the machine 102. Further, the unit 100 may compare a single measurement collected at 302 to an expected operating condition or a threshold above which physical proximity to the machine 102 may be assumed. Such an expected operating condition may be entered manually, read from the location tag 108, or otherwise preprogrammed into the unit 100.

If the preliminary data collected at 302 is determined at 308 to indicate that the unit 100 is physically proximal to the machine 102, the determining process 204 may be complete. On the other hand, if the preliminary data does not indicate that the unit 100 is physically proximal to the machine 102, the determining process 204 may proceed to the unit 100 checking if the preliminary data collection timer has expired, as at 310. As noted above, the preliminary data collection timer may provide a set stopping point for the preliminary data collection at 302 and/or the determining process 204, in some cases, even if the preliminary data does not indicate that the unit 100 is positioned physically proximal to the machine 102. Accordingly, if the unit 100 determines that the preliminary data collection timer has not expired, determining at 204 may proceed back to collecting preliminary data using the probe 104, as at 302. Otherwise, the determining process 204 may be complete.

Figure 4:
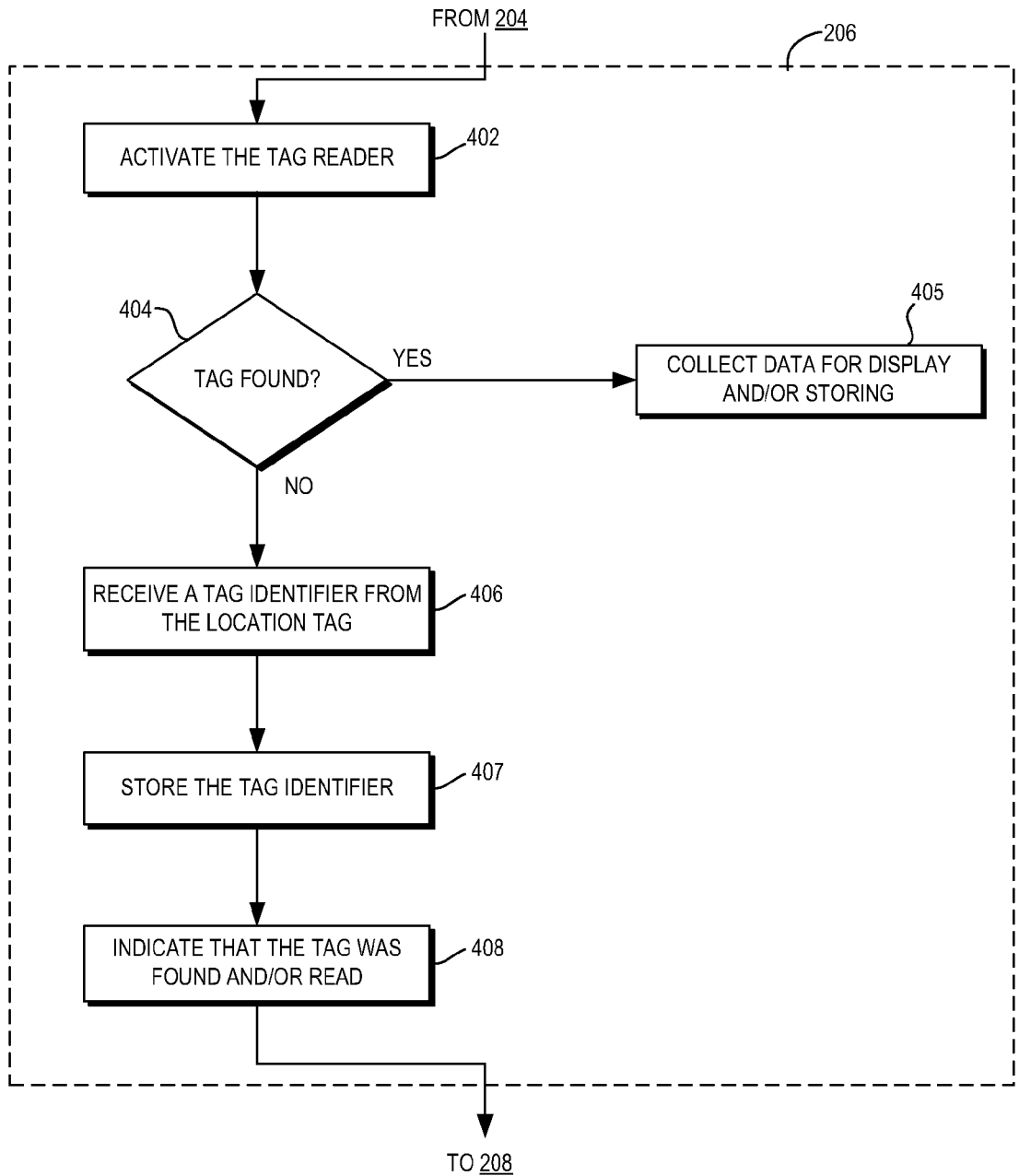
FIG. 4 illustrates a flowchart of a process for reading a location tag of the machine, which may be employed as a part of the method of FIG. 2, according to an embodiment.

Referring back to FIG. 2, once the determining at 204 is complete, the method 200 may proceed to reading a tag identifier from the location tag 108 associated with the machine 102, as at 206. FIG. 4 illustrates a flowchart of a process for reading the location tag 108, at 206, according to an embodiment. As shown, the unit 100 may activate the tag reader 106, as at 402. Activating the tag reader 106 at 402 may include, for example, energizing one or more inductor coils of the tag reader 106, for example, in an embodiment in which the location tag 108 is one or more RFID tags. Such energizing may cause the location tag 108 to respond with a signal containing information such as the tag identifier.

The unit 100 may determine whether the location tag 108 is found, as at 404, based on whether the tag reader 106 receives a responsive signal from the location tag 108 after energizing the tag reader 106. On the other hand, if an amount of time expires during which no responsive signal is received, the unit 100 may determine that it is unable to find a location tag 108. In such case, the display 112 may display an error message and/or request that the unit 100 be moved closer to the location tag 108 and/or the method 200 may proceed to collecting data for display and/or storage without association with a location tag 108, as at 405. Thus, even without finding a location tag 108, the unit 100 may preserve basic functionality of condition monitoring of the machine 102 and may, for example, determine whether operating conditions are indicative of component failure, off-design operating conditions, dangerous conditions, and/or the like. Further, the data collection at 405 may also include detecting a steady-state measurement, freezing the display, etc., as will be described in greater detail below.

If the location tag 108 is found at 404, the reading process 206 may proceed to receiving the tag identifier from the location tag 108, as at 406. Further, in response to a successful reception of the tag identifier, the processor 110 may, for example, cause the database 114 to store the tag identifier, as at 407. The unit 100 may also indicate that the location tag 108 was successfully found and/or read, as at 408. Such an indication may be visual, for example, by indication on the display 112. Instead or additionally, the indication may be effected by an indicator light (e.g., a light-emitting diode (LED) lighting, flashing, etc.), or it may be audible (e.g., via a tone from a speaker), or the unit 100 may shake or vibrate. It will be appreciated that such an indication may be effected in many different ways without departing from the scope of the present disclosure. Accordingly, the user may be made aware of whether the unit 100 has found the location tag 108 and is proceeding through to subsequent portions of the method 200, or whether the location tag 108 was not found at 404, and the unit 100 is proceeding with basic functionality.

Figure 5:
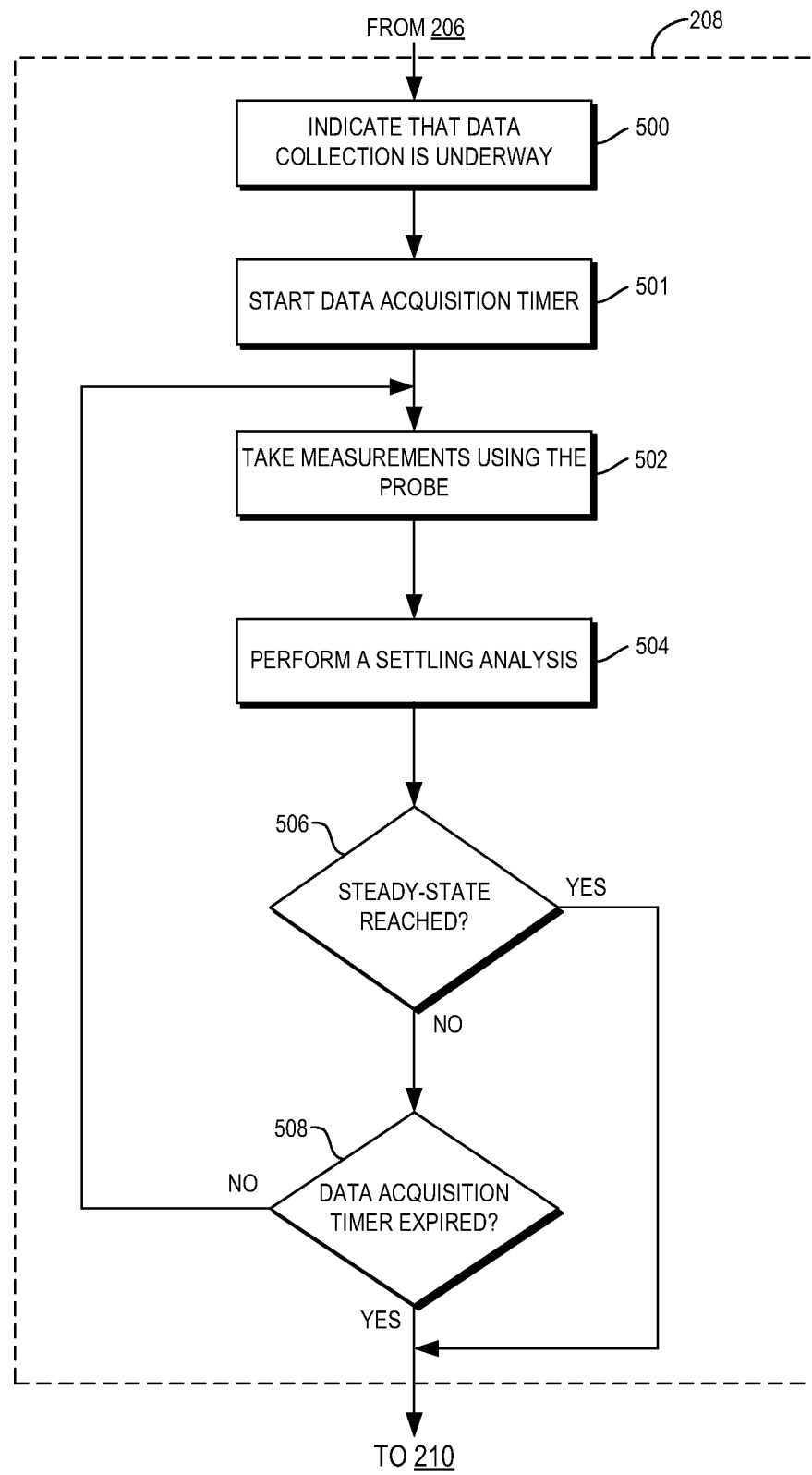
FIG. 5 illustrates a flowchart of a process for detecting a steady-state measurement, which may be employed as part of the method of FIG. 2, according to an embodiment.

Referring again to FIG. 2, with the unit 100 activated at 202, determined to be proximal (e.g., in contact with) the machine 102 at 204, and the location tag 108 read (and, e.g., stored) at 206, in any order, the method 200 may proceed to detecting a steady-state measurement, as at 208. In some embodiments, however, detecting at 208 may precede reading the location tag 108 at 206 or may be simultaneous therewith. FIG. 5 illustrates a flowchart of a process for detecting a steady-state measurement at 208, according to an embodiment. As shown, the detection process 208 may begin by indicating that data collection is underway, as at 500. Such an indication may be effected in any suitable way, for example, by showing a message on the display 112, causing an LED to light up, flash, change color, etc., by sounding a tone, and/or the like.

The detection process 208 may, in some embodiments, include initiating a data acquisition timer, as at 501. The data acquisition timer may be set according to an estimated time before which steady-state measurement should be reached. Accordingly, the data acquisition timer may avoid the unit 100 becoming stalled, in case the unit 100 does not determine that steady-state is reached, for example, if the machine 102 is operating erratically or otherwise over a range of operating conditions. In various embodiments, the data acquisition timer may be on the order of seconds, but in other cases may be milliseconds, minutes, etc.

The detection process 208 may also include taking measurements using the probe 104, as at 502. The measurements taken at 502 may be sampled by the processor 110 at any suitable frequency. However, transient data not associated with the operating conditions of the machine 102 may be included in such measurements initially. For example, when collecting vibration data, a transient vibration may be caused by the unit 100 contacting the machine 102. When collecting temperature, the probe 104 response to the changed temperature between ambient and the machine 102 may not be instantaneous. Accordingly, the processor 110 may perform a settling analysis, as at 504, to determine when transients are attenuated and the probe 104 is reading substantially steady-state measurement, i.e., within a threshold of variation tolerance. A variety of such settling algorithms for such an analysis are known and any suitable settling algorithm may be employed.

If the unit 100 determines, as at 506, that a steady-state measurement is not reached, for example, the unit 100 may proceed to determining if the data acquisition timer has expired, as at 508. If the data acquisition timer has expired, the unit 100 may assume the most recent data point collected, an average of the most recent data points, or the like is an estimation of the steady-state measurement. If an estimation of the steady-state measurement is used, a warning message or other indicator of such estimation may be displayed or otherwise signaled to the user. On the other hand, if the data acquisition timer has not expired, the unit 100 may return to collecting data at 502, since the transients still appear to be present and the data acquisition timer has not forced an end to data collection. This loop may continue until either the settling constraints are satisfied at 506 or the data acquisition timer expires at 508.

Moreover, at any point during the detection process 208, the processor 110 sampling the data measured by the probe 104 may determine if dangerous conditions exist. If such dangerous conditions are apparent, the processor 110 may indicate an alarm and/or take other remedial and or safety actions.

Returning to FIG. 2, with the steady-state measurement found (or estimated) at 208, and the tag identifier read at 206, in any order, the method 200 may continue to storing the steady-state measurement in association with the tag identifier, as at 210. In some embodiments, the steady-state measurement may also be stored in association with a time and/or date (referred to in FIG. 2 as a "timestamp") at which the measurement was taken. The processor 110 may cause the measurement (and/or timestamp) to be stored in the database 114, for example, in a database object associating the measurement, the tag identifier, and the timestamp. Accordingly, multiple data collections of multiple different machines 102 may be stored in the same database 114, for example, for downloading to a computing device for subsequent analysis (e.g. trending, diagnosis, etc.). Furthermore, the unit 100 may collect multiple measurements over time and may store such measurements in the database 114, e.g., in association with the tag identifier and/or any other information. This may allow frequency responses and/or other system reactions to perturbations and/or operating point changes, or any other operating conditions to be observed over time and stored for later analysis. Moreover, the measurement stored at 210 may include the measurements taken at 502 and/or, in some cases, may also include one or more preliminary measurements taken at 302.

Before, during, or after such storing of the measurement(s) at 210, the method 200 may also include ending data collection, e.g., by powering down the probe 104 and/or the processor 110 ceasing to sample data from the probe 104. However, before, during, or after ending the data collection, the unit 100 may enter another hold mode, freezing the display 112, as at 212, such that the display 112 shows the most recent (e.g., the steady-state) measurement. This may allow for the unit 100 to be removed from contact with the machine 102, e.g., after the termination of data collection, and the display 112 read by an operator. Such freezing of the display 112 may be considered storing of the measurement at 210, since it is available for subsequent retrieval and/or analysis, or it may be considered separately, as shown. The display 112 may remain frozen until an input indicator releases the display 112 from this second hold mode, such as, for example, by pressing the button 118, by powering down the unit 100, or in any other suitable way.

Figure 6:
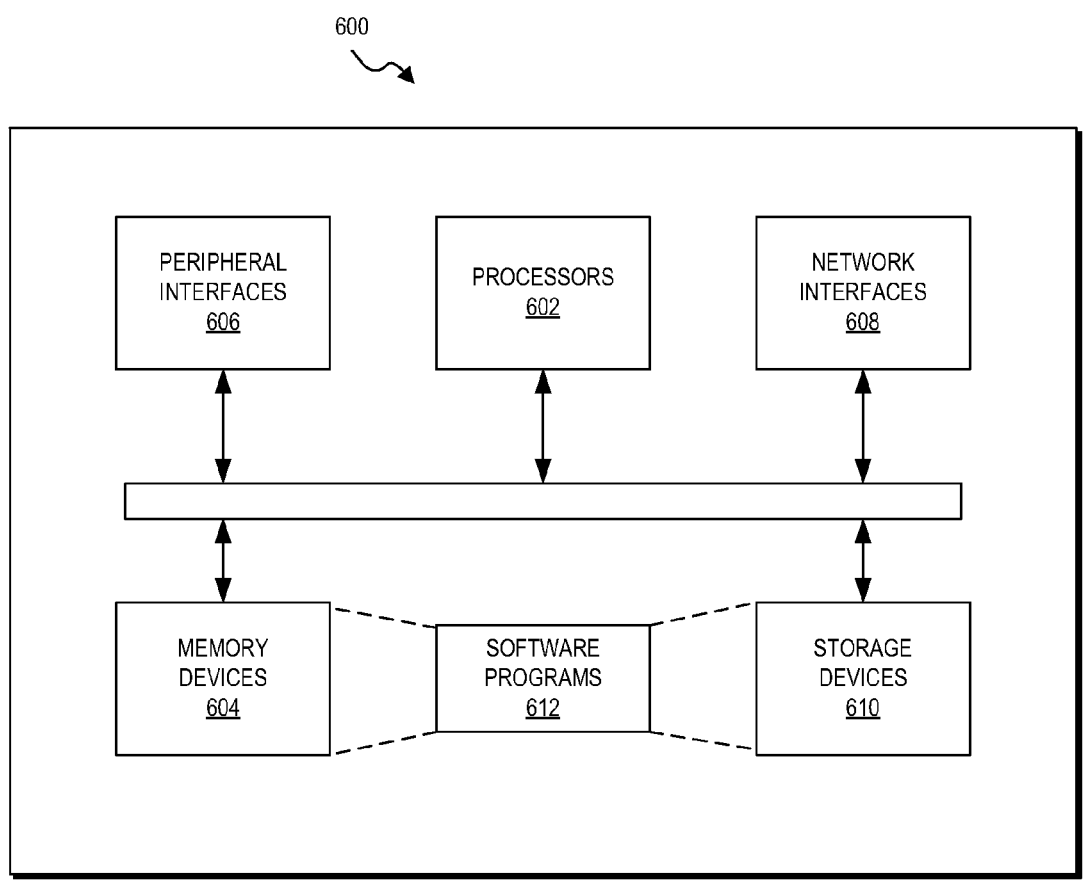
FIG. 6 illustrates a schematic view of a processor system, according to an embodiment.

FIG. 6 illustrates a schematic view of a computing or processor system 600, according to an embodiment. The processor system 600 may be embodied by hardware and/or software included in the unit 100, and thus may operate to implement one or more aspects of the method 200. Further, it will be appreciated that in various embodiments, the unit 100 may include multiple processor systems 600. The processor system 600 may include one or more processors 602 of varying core configurations (including multiple cores) and clock frequencies. The one or more processors 602 may be operable to execute instructions, apply logic, etc. It may be appreciated that these functions may be provided by multiple processors or multiple cores on a single chip operating in parallel and/or communicably linked together.

The processor system 600 may also include a memory system, which may be or include one or more memory devices and/or computer-readable media 604 of varying physical dimensions, accessibility, storage capacities, etc. such as flash drives, hard drives, disks, random access memory, etc., for storing data, such as images, files, and program instructions for execution by the processor 602. In an embodiment, the computer-readable media 604 may store instructions that, when executed by the processor 602, are configured to cause the processor system 600 to perform operations. For example, execution of such instructions may cause the processor system 600 to implement one or more portions and/or embodiments of the method 200 described above.

The processor system 600 may also include one or more network interfaces 606. The network interfaces 606 may include any hardware, applications, and/or other software. Accordingly, the network interfaces 606 may include Ethernet adapters, wireless transceivers, PCI interfaces, and/or serial network components, for communicating over wired or wireless media using protocols, such as Ethernet, wireless Ethernet, etc.

The processor system 600 may further include one or more peripheral interfaces 608, for communication with the display 112, the input indictors, and, in some cases, the probe 104 and/or the tag reader 106. The peripheral interface 608 may also communicate with any projectors, keyboards, mice, touchpads, sensors, other types of input and/or output peripherals, and/or the like connected to the unit 100. In some implementations, the components of processor system 600 need not be enclosed within a single enclosure or even located in close proximity to one another, but in other implementations, the components and/or others may be provided in a single enclosure.

The memory device 604 may be physically or logically arranged or configured to store data on one or more storage devices 610. The storage device 610 may include one or more file systems or databases, such as the database 114 in any suitable format. The storage device 610 may also include one or more software programs 612, which may contain interpretable or executable instructions for performing one or more of the disclosed processes. When requested by the processor 602, one or more of the software programs 612, or a portion thereof, may be loaded from the storage devices 610 to the memory devices 604 for execution by the processor 602.

Those skilled in the art will appreciate that the above-described componentry is merely one example of a hardware configuration, as the processor system 600 may include any type of hardware components, including any necessary accompanying firmware or software, for performing the disclosed implementations. The processor system 600 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 600 may be used to execute programs according to instructions received from another program or from another processor system altogether. Similarly, commands may be received, executed, and their output returned entirely within the processing and/or memory of the processor system 600. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

Moreover, in the foregoing description, locating a first feature over or on a second feature may include embodiments in which the first and second features are formed in direct contact, and may also include embodiments in which additional features may be formed interposing the first and second features, such that the first and second features may not be in direct contact. Finally, the various embodiments presented above may be combined in any combination of ways, i.e., any element from one embodiment may be used in any other embodiment, without departing from the scope of the disclosure.

What is claimed is:

1. A method for collecting data, comprising:
   determining, using a data collection unit, that the data collection unit is proximal to a machine, wherein determining that the data collection unit is proximal to the machine comprises:
   initiating a preliminary data collection timer;
   after initiating the preliminary data collection timer, and prior to the preliminary data collection timer expiring, taking one or more preliminary measurements using a sensor of the data collection unit;
   determining that the one or more preliminary measurements indicate that the data collection unit is physically proximal to the machine;
   receiving a tag identifier from a tag positioned in, on, or near a machine, using a tag reader of the data collection unit;
   taking one or more measurements of one or more operating conditions of the machine, using the sensor of the data collection unit;
   storing the one or more measurements; and
   associating the one or more measurements with the tag identifier.

2. The method of claim 1, wherein determining that the data collection unit is physically proximal to the machine comprises:
   taking a first preliminary measurement using the sensor;
   taking a second preliminary measurement using the sensor; and
   determining that a difference between the first preliminary measurement and second preliminary measurement indicates that the sensor is measuring data associated with operation of the machine.

3. The method of claim 1, wherein determining that the data collection unit is physically proximal to the machine comprises:

taking a preliminary measurement using the sensor; and determining that the preliminary measurement indicates that the sensor is measuring data associated with operation of the machine.

4. The method of claim 1, wherein the tag comprises a radio frequency identification tag.

5. The method of claim 1, further comprising finding a steady-state measurement using the data collection unit, wherein storing the one or more measurements comprises storing the steady-state measurement.

6. The method of claim 5, wherein finding the steady-state measurement comprises:

taking a plurality of measurements using the sensor; and performing a settling analysis to determine when the plurality of measurements have settled within a threshold.

7. The method of claim 6, wherein finding the steady-state measurement further comprises:

initiating a data collection timer;

determining that the data collection timer has expired prior to the settling analysis indicating that the plurality of measurements have settled; and estimating the steady-state measurement based on one or more of the plurality of measurements.

8. The method of claim 1, wherein storing the measurement comprises freezing a display of the data collection unit with the display showing the measurement.

9. A non-transitory computer-readable medium storing instructions that, when executed, are configured to cause a data collection unit to perform operations, the operations comprising:

receiving a tag identifier from a tag positioned in, on, or near a machine, using a tag reader of the data collection unit;

taking a plurality of measurements of one or more operating conditions of the machine, using a sensor of the data collection unit;

finding a steady-state measurement of the plurality of measurements using the data collection unit, wherein finding the steady-state measurement comprises performing a settling analysis to determine when the plurality of measurements have settled to within a threshold value of one another;

storing the steady-state measurement; and associating the steady-state measurement with the tag identifier.

10. The computer-readable medium of claim 9, wherein the operations further comprise determining whether the data collection unit is physically proximal to the machine.

11. The computer-readable medium of claim 10, wherein determining whether the data collection unit is physically proximal to the machine comprises:

taking a first preliminary measurement using the sensor;

taking a second preliminary measurement using the sensor; and determining that a difference between the first preliminary measurement and second preliminary measurement indicates that the sensor is measuring data associated with operation of the machine.

12. The computer-readable medium of claim 10, wherein determining whether the data collection unit is physically proximal to the machine comprises:

taking a preliminary measurement using the sensor; and determining that the preliminary measurement indicates that the sensor is measuring data associated with operation of the machine.

13. The computer-readable medium of claim 9, wherein the tag comprises a radio frequency identification tag, wherein the operations further comprise powering the tag using the tag reader.

14. The computer-readable medium of claim 9, wherein finding the steady-state measurement further comprises:

initiating a data collection timer;

determining that the data collection timer has expired prior to the settling analysis indicating that the plurality of measurements have settled; and estimating the steady-state measurement based on one or more of the plurality of measurements.

15. The computer-readable medium of claim 9, wherein storing the measurement comprises freezing a display of the data collection unit with the display showing the measurement.

16. A non-transitory, computer-readable medium storing instructions that, when executed, are configured to cause a data collection unit to perform operations, the operations comprising:

determining whether the data collection unit is physically proximal to the machine, wherein determining comprises:

initiating a preliminary data collection timer;

taking one or more preliminary measurements using the sensor; and determining that the preliminary data collection timer has expired before one or more preliminary measurements indicate that the data collection unit is physically proximal to the machine; or determining that, prior to the data collection timer expiring, the one or more preliminary measurements indicate that the data collection is physical proximal to the machine; and when the data collection unit is determined to be physical proximal to the machine:

receiving a tag identifier from a tag positioned in, on, or near a machine, using a tag reader of the data collection unit;

taking one or more measurements of one or more operating conditions of the machine, using a sensor of the data collection unit;

storing the one or more measurements; and associating the one or more measurements with the tag identifier.

* * * * *